K. KEMPNY.
NON-SKIDDING DEVICE.
APPLICATION FILED MAY 24, 1917.
1,247,281.
Patented Nov. 20, 1917.
2 SHEETS—SHEET 2.
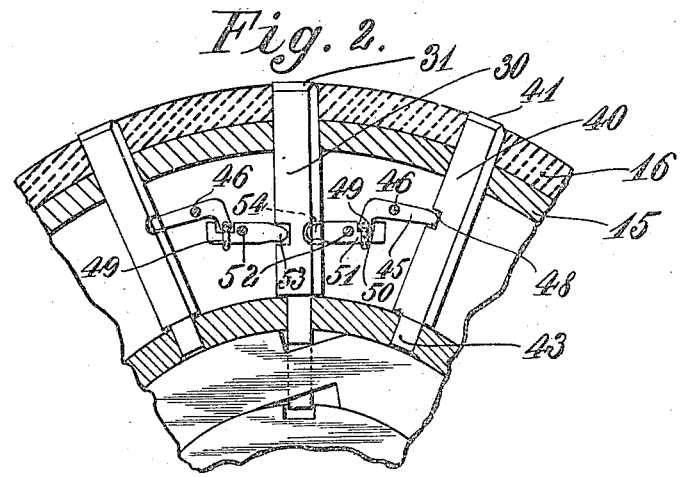
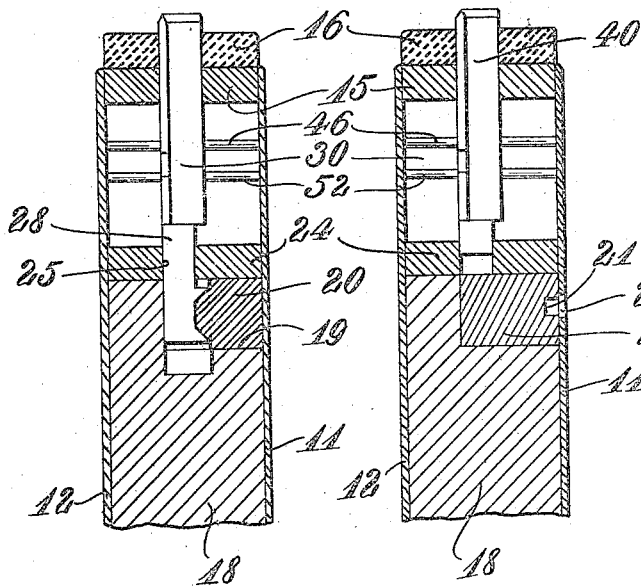
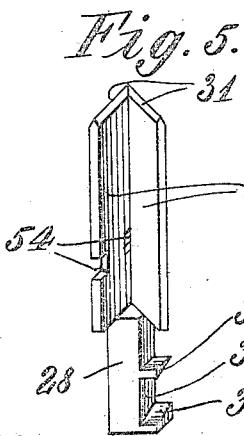
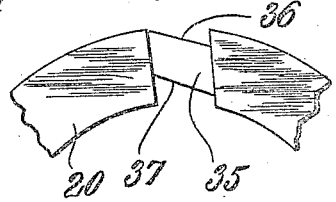
Inventor
Karol Kempny.
By his Attorney
Oscar Jeier

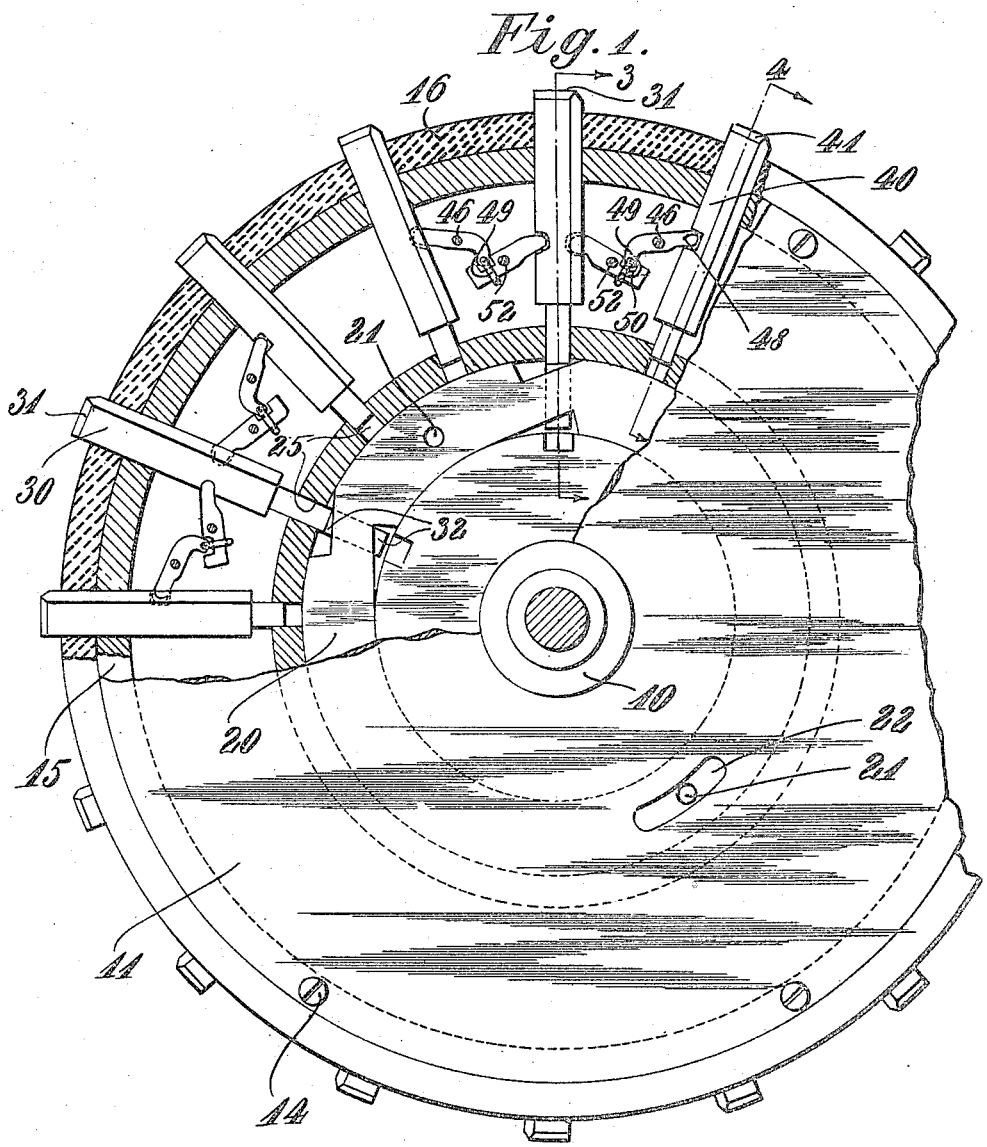

UNITED STATES PATENT OFFICE.

KAROL KEMPNY, OF CLEVELAND, OHIO.

NON-SKIDDING DEVICE.

1,247,281.  Specification of Letters Patent.  Patented Nov. 20, 1917.

Application filed May 24, 1917. Serial No. 170,656.

*To all whom it may concern:*

Be it known that I, KAROL KEMPNY, a subject of the Emperor of Austria, resident of Cleveland, county of Cuyahoga, and State of Ohio, have invented certain new and useful Improvements in Non-Skidding Devices, of which the following is a specification.

This invention relates to improvements in non-skidding devices, as applied to vehicle wheels, and has as its principal object the provision of means which effectually prevent the skidding or lateral action of the tire upon a pavement, such as frequently occurs, when the same are wet, oily, or covered with ice.

A further object is to provide such devices in forms which may be readily projected or retracted so that the same may be held under complete control of the operator at all times.

A still further object is to provide such devices in forms which are relatively inexpensive to construct, durable in their nature, and efficient in their operation.

These and other like objects are attained by the novel construction and combination of parts hereafter described and shown in the accompanying drawings, forming a material part of this specification, and in which:—

Figure 1 is a fragmental side elevational view of a wheel made in accordance with the invention, parts being broken away in order to disclose the construction.

Fig. 2 is a fragmental vertical sectional view showing the abrading elements in a retracted position.

Fig. 3 is a transverse sectional view taken on line 3—3 of Fig. 1.

Fig. 4 is a similar transverse sectional view taken on line 4—4 of Fig. 1.

Fig. 5 is a perspective view showing in detail one of the abrading elements, and Fig. 6 is a fragmental plan view showing the cam ring by which the abrading elements are controlled.

In the drawings, the wheel is shown to be comprised of a hub 10, of any ordinary type of construction, to which is secured a pair of circular side plates, respectively 11 and 12, the same being fastened by screws 14 or the like to the rim 15 circumjacent to which the tire or tread 16 is engaged.

A solid disk 18 is secured between the plates 11 and 12, at the center of the wheel, and has formed in its outer edge upon one side thereof an annular groove 19, containing a ring 20 mounted to freely rotate therein.

Formed at spaced intervals in the ring 20 are a plurality of circular openings 21, the same appearing and being accessible through arcuate slots 22 formed through the side plate 11, and by means of which the ring may be turned to a limited extent.

A fixed annular ring 24 is secured to the center 18, and has formed radially through it a plurality of rectangular openings 25 receptive of the shanks or stems 28 of the spurs formed of two integral plates 30 disposed at right angles and terminating in sharp edges 31.

Formed with the extending shanks 28 are a pair of lateral projections 32, containing between them a transverse recess 33, adapted to engage the bars 35, formed between the main annular element of the ring 20, in such manner that the angular edge 36 abuts against the projection 32 upon one side while the corresponding angle 37 abuts against the projection upon the opposite side, thereby conveying rectilinear motion to the shanks and spurs as the ring 20 is rotated.

Appropriate openings are formed through both the tread 16 and rim 15, the same registering with the openings 25 in the ring 24 so that the spurs are held in a substantially radial position as they are moved lengthwise by the cam-shaped connecting bars 35, thereby causing the ends 31 to project beyond the periphery of the tread 16 or to retract so as to be substantially level therewith.

Interposed between the spurs 30, at regular intervals, are similarly formed spurs 40, having edges 41 extending through in a similar manner, their shanks 43 being engaged in alternate openings formed in the ring 24, and moved longitudinally by means of the levers 45, pivoted at 46, one end of each of the levers being positioned in an opening 48 formed in the spur 40, the other ends of the levers being engaged by loops 49 within transverse slots 50 formed within the levers 51 pivoted on the pins 52 and having oppositely extending ends 53 engaged within the slots 54 formed in one of the plates 30.

Thus, when one of the spurs 30 is moved in and out a corresponding longitudinal motion is conveyed to the other spurs, causing them to move simultaneously upon the rotating of the ring 20.

From the foregoing, it will be seen that the wheel is provided with a plurality of spurs by merely rotating the annular ring 20 in one direction or by turning the ring in the opposite direction the spurs are retracted within the periphery of the tire so as not to project beyond.

It will be further evident that the parts employed are simple in their nature and well adapted to perform the functions expected of them.

Having thus described my invention, what I claim as new and desire to secure by Letters Patent, is:—

1. In a device of the class described, the combination with a wheel having a fixed center, a rim circumjacent thereto, and a tread secured to said rim, of a ring semi-rotatably engaged with said fixed center, a plurality of radially disposed spurs extending through said rim and tread engageable with said ring, means formed with said spurs and said ring whereby the spurs may be moved longitudinally, a second plurality of spurs spaced intermediately between the first named spurs, and levers connecting between the first and second of said spurs whereby the second series of spurs may be operated.

2. In a non-skidding wheel, the combination with a pair of rigid side plates, a center secured therebetween, a rigid rim, and a tread secured to said rim, of an annular ring, means whereby said ring may be rotated, said ring being mounted within a recess in said fixed center, a plurality of cams formed in said ring, spurs slidable through said tread and rim, shanks formed with said spurs engageable with said cams in said ring, intermediate spurs disposed between said first named spurs, levers pivoted in pairs between said plates, one of said pair of levers operatively engaging one of the second named spurs, and the other of said levers being operable by one of the first named spur elements so that upon the rotation of said ring all of said spurs may be retracted or projected.

In testimony whereof I have affixed my signature.

KAROL KEMPNY.

Copies of this patent may be obtained for five cents each, by addressing the "Commissioner of Patents, Washington, D. C."